United States Patent

Forrest

[11] Patent Number: 5,897,796
[45] Date of Patent: Apr. 27, 1999

[54] METHOD AND APPARATUS FOR IN-SITU LASER WELDING OF HEMMED JOINTS

[75] Inventor: Mariana G. Forrest, Troy, Mich.

[73] Assignee: Chrysler Corporation, Auburn Hills, Mich.

[21] Appl. No.: 08/876,815

[22] Filed: Jun. 16, 1997

[51] Int. Cl.⁶ .................................................. B23K 26/00
[52] U.S. Cl. ................................. 219/121.64; 29/243.58
[58] Field of Search ...................... 219/121.63, 121.64; 29/243.58

[56] References Cited

U.S. PATENT DOCUMENTS

| | | |
|---|---|---|
| 4,642,446 | 2/1987 | Pennington . |
| 4,654,505 | 3/1987 | Sciaky et al. ............ 219/121 LC |
| 4,661,677 | 4/1987 | La Rocca . |
| 4,682,002 | 7/1987 | Delle Piane et al. . |
| 4,719,689 | 1/1988 | Yamamoto .................... 29/458 |
| 4,758,704 | 7/1988 | Kogel . |
| 4,833,295 | 5/1989 | Locker et al. . |
| 4,873,415 | 10/1989 | Johnson et al. . |
| 4,901,555 | 2/1990 | Shimoichi .................... 29/243.58 |
| 4,906,812 | 3/1990 | Nied et al. . |
| 4,916,284 | 4/1990 | Petrick ......................... 219/121.64 |
| 4,945,489 | 7/1990 | Vahab .......................... 219/121.63 |
| 5,115,115 | 5/1992 | Alborante . |
| 5,125,780 | 6/1992 | Buden-Bender . |
| 5,131,710 | 7/1992 | Kamiguchi et al. . |
| 5,142,118 | 8/1992 | Schlatter . |
| 5,237,734 | 8/1993 | Polon ........................... 29/243.58 |
| 5,347,528 | 9/1994 | Haruta et al. . |
| 5,380,978 | 1/1995 | Pryor ........................... 219/121.64 |
| 5,451,742 | 9/1995 | Nishio et al. . |
| 5,539,180 | 7/1996 | Mori et al. . |
| 5,591,358 | 1/1997 | Quagline ..................... 219/121.63 |

FOREIGN PATENT DOCUMENTS

| | | |
|---|---|---|
| 1-186222 | 7/1989 | Japan . |
| 220676 | 1/1990 | Japan . |
| 4270084 | 9/1992 | Japan . |
| 6285659 | 10/1994 | Japan . |

OTHER PUBLICATIONS

1. "Combining the punching process with laser technology", Automotive Manufacturing International, Robotics and Automation, Ingomar J K Summerauer, Bruderer AG, pp. 67–69.
2. "Door Welding Using a 3000 Watt Multiplexed Nd: YAG Laser", IBEC '96, Body Assembly & Manufacturing, Darrell Stafford, Honda Motor Company, pp. 53–57.

Primary Examiner—Geoffrey S. Evans
Attorney, Agent, or Firm—Thomas G. Pasternak

[57] ABSTRACT

A method and apparatus for in-situ laser welding of a hemmed joint are applicable for, among other things, production of vehicle doors having inner and outer panels to be joined. In a preferred method, the laser welding of a hemmed joint is carried out while a stable condition is maintained between the inner and outer panels. Locating members of a hemming machine are engaged with the metal sheets to be joined and a compressive force is applied to the panels. A plurality of welding units may be sequentially or simultaneously controlled by a computer. The apparatus includes a first portion for vertically locating the hemmed joint and a second portion for horizontally locating the hemmed joint.

23 Claims, 6 Drawing Sheets

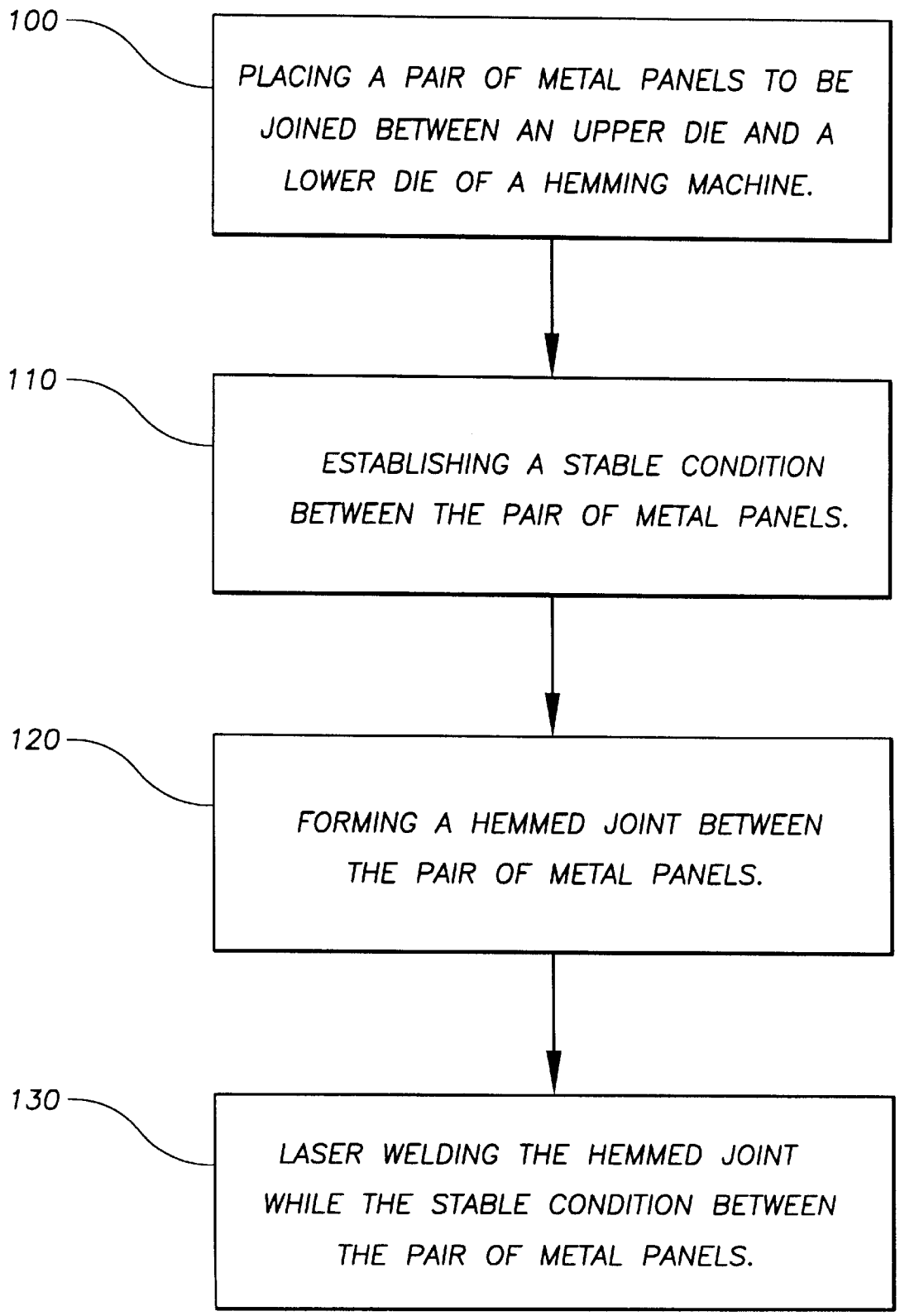

METHOD AND APPARATUS FOR IN-SITU LASER WELDING OF HEMMED JOINTS

BACKGROUND OF THE INVENTION

1. Field of the Invention

The present invention relates to a method and apparatus for laser welding a pair of metal sheets. More particularly, the present invention relates to a method and apparatus for in-situ laser welding of sheets of material which are to be joined with a hemmed joint. The method and apparatus has particular applicability for assembling parts such as a door of a motor vehicle, wherein inner and outer panels of the door are joined about their perimeters by a welded hemmed joint.

2. Description of the Related Art

It is a common practice in the manufacture of motor vehicle body parts to join sheets of material by hemmed joints, also called hems. Often, hemmed joints are not secured other than by the pressure of the hemming process itself and by adhesive. The adhesive helps to secure the inner and outer panels together and also serves as a corrosion preventative sealer.

It is also known to spot weld locations along the hemmed joints after the stamping process to further secure the connection. However, this is disadvantageous in that it typically requires subsequent metal finishing at the spot weld locations. Additionally, the metal panels may not retain proper orientation to one another when they are transported from the hemming machine to the welding machine.

It also is known to laser weld the hemmed joint after removal from the hemming press. Laser welding has many advantages over conventional resistance welding. For example, laserwelding provides low distortion, small heat affected zones (HAZ), improved mechanical/structural performance, increased speed of processing, improved process controllability/consistency and single sided access. Typically, laser welding systems utilize welding clamps which clamp and fix the parts to be welded together. Robots are used to perform the laser welding operation.

In laser welding, a laser beam generator or source generates or produces a laser beam. The laser beam is transmitted to a focusing head via a fiber optic cable. The focusing head is typically installed or mounted on the end of the robot arm. The robot is then programmed to accurately position the focusing head, and thus the laser beam focal point, relative to the parts to be welded. The welding is done sequentially as the robot moves from weld joint to weld joint. One significant disadvantage of laser welding is the requirement of tight air gaps between the parts to be welded, which in turn requires precise positioning of the laser beam relative to the parts to be welded.

Welding systems for vehicle bodies and the like are described in U.S. Pat. Nos. 4,654,505 issued Mar. 31, 1987 to Sciaky et al. and 5,616,261 issued Apr. 1, 1997 to Forrest. The '505 patent employs a laser beam delivery system using multiple motor driven optical mirrors controlled by a computer program to focus a laser beam upon a single point on the parts to be welded. The '261 patent discloses a laser welding system for welding sheets of material, such as automobile body parts. The system includes a fiber optic cable for each of a plurality of clamps having a first end coupled to a laser beam source and a second end coupled to a clamp for transmitting a laser beam from the laser beam source to the clamp. The system further includes a focusing head secured to each clamp and the second end of the cable for focusing the laser beam onto the material to be welded. U.S. Pat. Nos. 4,654,505 and 5,616,261 are incorporated by reference as if fully set forth herein.

Heretofore, laser welding of hemmed joints has been limited to post-hemming operation in a separate fixture. This approach has various difficulties and limitations, including but not limited to the following: (1) difficulty in beam focus point positioning relative to the critical features of the hemmed flange (i.e., surface, edge, or gap); (2) increased demand on quality control of stamping for flange position repeatability (in the case of preprogrammed robot positioning); (3) increased demand on quality control of stamping for a welded control gap (particularly in the case of lap welding) in order to guarantee weld penetration and strength; (4) onerous requirements for high performance seam tracking ability, which is especially critical for thin sheet metal used in vehicle door outer panels (to deal with the case of uncertain flange position); (5) possible relative movement between the parts to be joined during motion of the hemming machine and prior to welding; (6) possible panel distortion during welding due to sequential welding and lower thermal mass of contact surface elements; and (7) excessively long cycle times, due to limited welding speeds, seam tracking dynamic response time, and time spent by robots to travel between weld sites.

Thus, known welding techniques, including but not limited to those discussed above, present various difficulties in the welding of hemmed joints as known prior systems are intended to laser weld sheets of materials at a location and time spaced apart from other joining and/or assembly procedures.

SUMMARY OF THE INVENTION

Accordingly, it is a principal object of the present invention to provide an apparatus and method for laser welding a hemmed joint wherein the laser welding operation is performed "in-situ," that is, in conjunction with and by the same machine that performs the actual hemming operation. In-situ laser welding offers the advantages of conventional laser welding without the necessity of transporting the hemmed panels. Thus, the "shifting panel" problem is solved. Furthermore, the apparatus and space involved is reduced, since no moving equipment or robotic laser machinery is required for the laser welding operation.

It is another object of the present invention to provide an in-situ laser welding system for hemmed joints including a controlled, computerized time-share installation for distributing a laser beam sourced from a single laser generator in a pre-programmed sequence, to welding locations in the hemming press via a plurality of fiber optic cables.

Advantages achieved by the present invention include: dimensional integrity, low part distortion, process robustness, lower equipment complexity, lower cost, no need for path programming, no need to program robots, and/or to use seam tracking, flexibility/reconfigurability/ reuse of clamping elements, consistent welding quality, ability to weld a much larger part, increased productivity (versus robotic laser welding), reduced operating cost through reduced cover gas consumption, increased potential for superior weld quality which leads to opportunity to eliminate need for structural adhesive and reducing the cost of material and expenses and the time incurred in the adhesive cure process, elimination of subsequent surface finishing (i.e., by avoiding the resistance welding of hemmed panels, employed heretofore to prevent panel-to-panel relative motion), elimination of surface post-finishing generally required due to panel deformation on the visible surface, and improved safety (beam can be contained within clamp, and remains in known fixed position during welding).

In one form, the present invention provides a method of producing a laser welded hemmed joint between a pair of metal panels or sheets. The method includes the step of placing the pair of metal sheets between an upper die and a lower die of a hemming machine. The upper die is carried by a translatable shoe which includes a plurality of locating members. The method additionally includes the step of engaging the pair of metal sheets with the locating members to ensure proper orientation between the pair of metal sheets and establish a stable condition. Next, a hemmed joint is formed between the pair of metal sheets. Finally, the hemmed joint is laser welded while the locating members remain engaged with the pair of metal sheets to maintain the stable condition.

In a more preferred form, the method of the present invention is specifically adapted for producing a laser welded hemmed joint between an inner and an outer panel of a vehicle door. The method includes the general steps of:
1. placing the inner and outer panels between an upper die and a lower die of a hemming machine, the upper die carried by a translatable shoe;
2. forming a hemmed joint between the inner and outer panels;
3. laser welding the hemmed joint with the locating members engaged with the inner and outer panels.

In another form, the present invention provides an arrangement for in-situ laser welding of a hemmed joint within a hemming machine. The hemmed joint is formed between a pair of metal panels. The hemming machine has an upper shoe translatable between an upper position, an intermediate position and a lower position. The upper shoe carries an upper die and at least one locating element. The hemming machine further including a lower die. The arrangement for in-situ laser welding includes at least one welding unit operatively interconnected with the hemming machine for movement between a first position interbetween the upper die and the lower die and a second position displaced therefrom. The arrangement further includes a laser beam source and a focusing head carried by each of the at least one welding unit. The focusing head is interconnected to the laser beam source. A computer controller is provided for controlling deliver of the laser beam source to the focusing head of each of the at least one welding unit. Preferably, the laser beam source is delivered to the focusing head when the upper shoe is between the lower position and the intermediate position.

The discussed and other features and advantages of the present invention will be more fully understood from the following detailed description of the invention taken together with the accompanying drawings.

BRIEF DESCRIPTION OF THE DRAWINGS

FIG. 8 is a flow diagram illustrating the general steps of the preferred method of the present invention.

DETAILED DESCRIPTION OF THE PREFERRED EMBODIMENT

Figure 1:
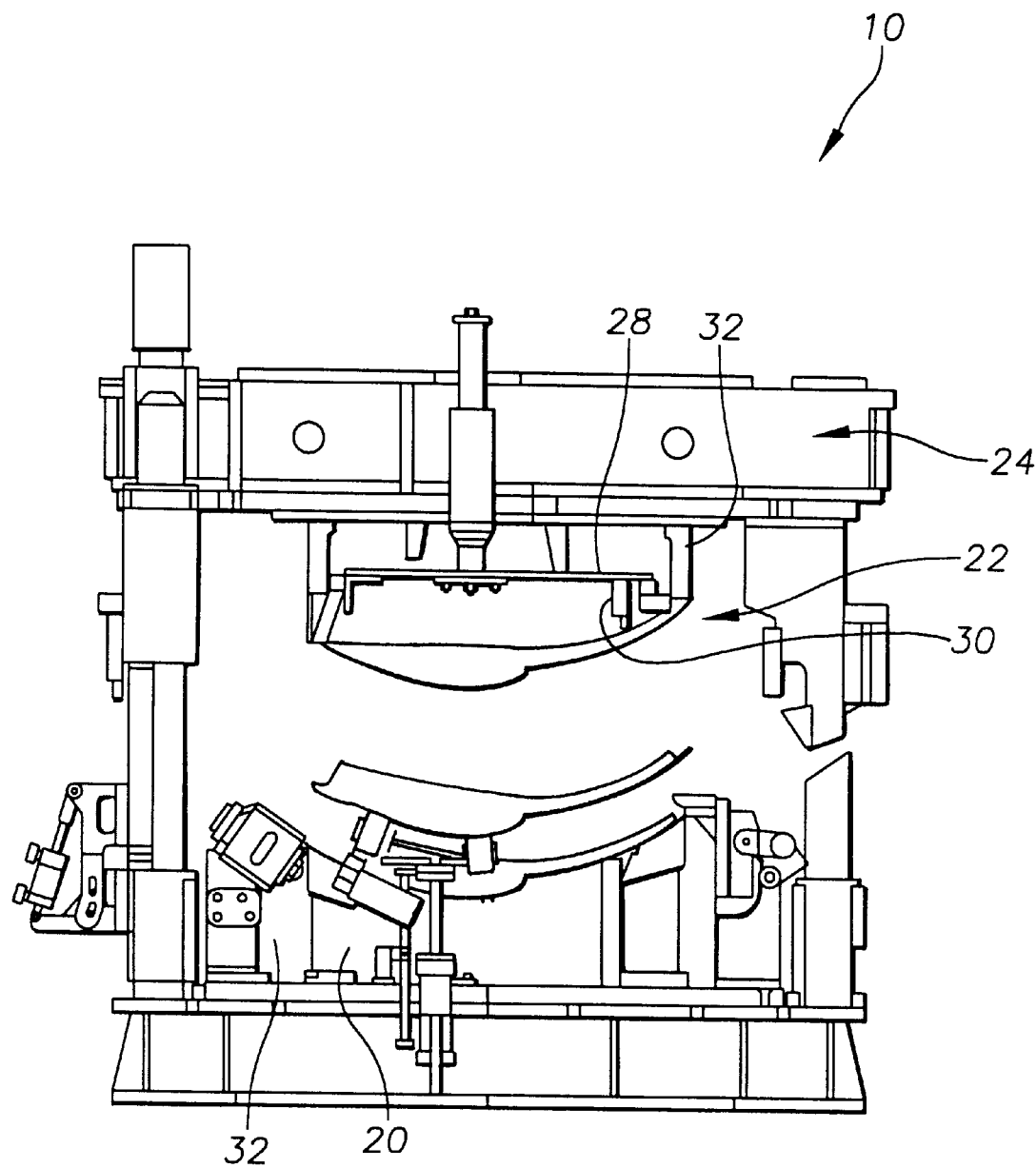
FIG. 1 is a side view of a hemming machine incorporating an arrangement for in-situ laser welding of hemmed joints constructed in accordance with the teachings of the preferred embodiment of the present invention.
Figure 2:
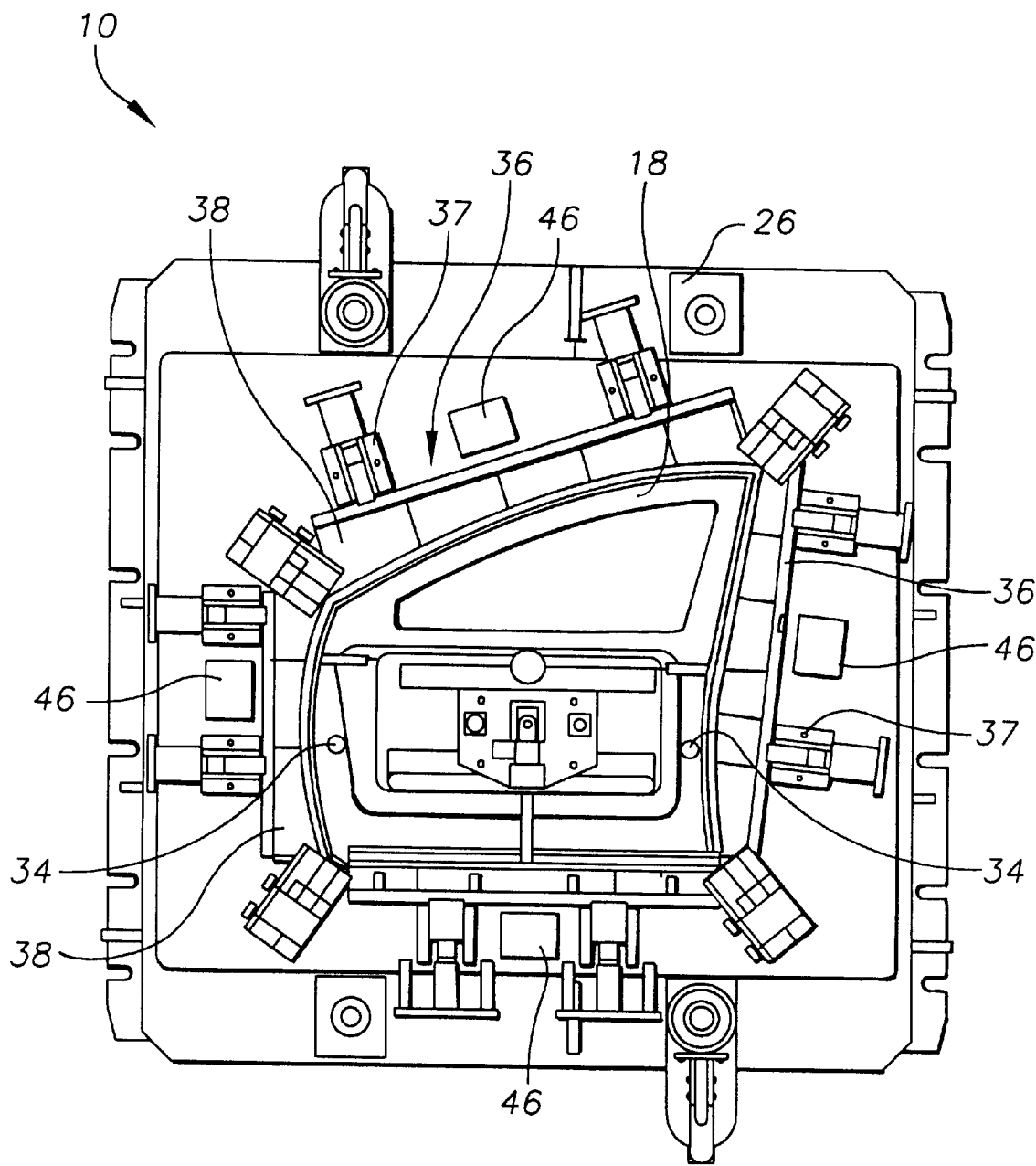
FIG. 2 is a top view of the system of FIG. 1.

With initial reference to FIGS. 1 and 2, a machine 10 incorporating an arrangement for in-situ laser welding of hemmed joints 12 constructed in accordance with the teachings of the preferred embodiment of the present invention is illustrated. Prior to addressing the construction and function of the present invention, a brief understanding of the machine 10 into which the teachings of the present invention are incorporated is warranted.

The machine illustrated in FIGS. 1 and 2 is a hemming machine 10 specifically intended for hemming inner and outer panels 14 and 16 of a vehicle door 18. A suitable hemming machine 10 is commercially available from Sanyo Machine of America. It will become apparent below that the teachings of the present invention have applicability significantly beyond the construction of vehicle doors 18. In this regard, this particular application should be considered to be merely exemplary.

The hemming machine 10 is shown to generally include a fixed base die or lower die 20 and a vertically displaceable upper die 22. The upper die 22 is carried by an upper die shoe 24 which is guided for vertical translation between an upper position (as shown in FIG. 1), an intermediate position and a lower or hemming position by a plurality of guide posts 26. In a conventional manner, the upper die shoe 24 also carries a spider plate 28 having a plurality of pressure fingers (not specifically shown) for engaging the door 18 and a plurality of locating members or locator pins 30. The locating members 30 are adapted to engage a corresponding plurality of locating holes 34 located in the vehicle door 18 for properly orienting the inner and outer panels 14 and 16. The upper and lower dies 20 and 22 are operatively associated with die blades 32.

The hemming machine 10 is also illustrated to include a plurality of prehemming units 36. In the embodiment illustrated, four prehemming units 36 are placed about the perimeter of the door 18. The prehemming units 36 may be inwardly advanced to initiate formation of the hemmed joint 35.

In a conventional manner, the inner and outer panels 14 and 16 of the vehicle door 18 are placed within the machine 10 and the upper die 22 is downwardly displaced from the position shown in FIG. 1. The upper shoe 24 of the hemming machine 10 is cycled between the upper position (as shown in FIG. 1) and the hemming position in which the upper and lower dies 20 and 22 act upon the vehicle door 18 to complete a hemmed joint 35 (shown in FIG. 3). As the upper shoe 24 begins to translate downwardly and reaches the intermediate position, the plurality of locating members 30 engage the locating holes 34 formed in the inner and outer panels 14 and 16. As a result, proper orientation between the inner and outer panels 14 and 16 is established and maintained. In addition, the fingers of the spider plate 28 engage the vehicle door 18 and established a predetermined clamping force. The predetermined clamping force is provided by a biasing force which biases the spider plate 28 to a downward position.

Once proper alignment and the clamping force have been established, the prehemming units 36 are simultaneously advanced toward the vehicle door 18 and conventionally function to initiate formation of the hemmed joint 35 to approximately forty-five degrees (45°). During continued downward displacement of the upper shoe 24, the prehemming units 36 are withdrawn and the upper die 22 completes the formation of the hemmed joint 35. Upon such completion, the upper shoe 24 begins to translate upward. As the upper shoe 24 is retracted to its upper position, the locating members 30 remain engaged with the locating holes 34 of the inner and outer panels 14 and 16 and the fingers of the spider plate 28 maintain the clamping force upon the door 18 for a period of approximately 2–4 seconds. This period represents a stable condition since proper alignment between the inner and outer panels 14 and 16 is maintained.

Figure 3:
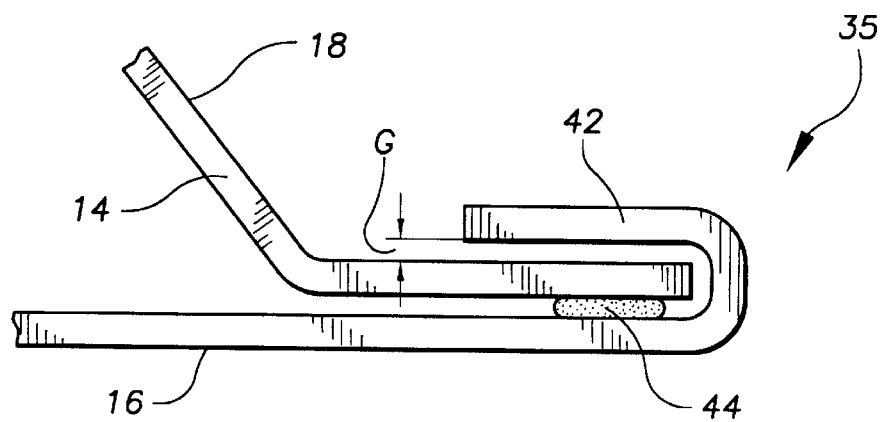
FIG. 3 is a fragmentary view illustrating the general configuration of a hemmed joint.

With reference to FIG. 3, the hemmed joint 35 formed by the hemming machine 10 is shown in fragmentary side view. As illustrated, the outer panel 16 is wrapped around the perimeter of the inner panel 14 so as to provide a hemmed flange 42. A gap G remains between the inner side of the hemmed flange 42 and the inner panel 14. A quantity of adhesive material 44, such as an epoxy resin or other suitable material, is shown deposited between the inner surface of the outer panel 16 and the outer surface of the inner panel 14. The adhesive 44 assists in securing the inner and outer panels 14 and 16 together and also functions as a corrosion preventive sealer.

With the foregoing as general background and with additional reference to FIGS. 4–7, the arrangement 12 for in-situ laser welding of the present invention will now be described. The laser welding arrangement 12 is illustrated to include a plurality of welding units 46 situated about the perimeter of the vehicle door 18 for in-situ spot welding of the hemmed joint 35. In the exemplary embodiment illustrated (shown most specifically in FIG. 2), the laser welding arrangement 12 is illustrated to include four substantially identical welding units 46. However, it will be appreciated that the number of welding units 46 employed is largely dictated by the size of the manufactured part and the required number of spot welds.

In the exemplary embodiment, the welding units 46 are mounted on the lower die base 20 about the periphery of the vehicle door 18. Mounting locations are chosen based on criteria such as panel functionality, dimensional control efficiency, thermal distortion minimization, and space availability (i.e., non-interference with the prehemming devices 36 existing on the lower die 20). As will become more apparent below, the welding units 46 are operative to move in and out of the space between the lower and upper dies 20 and 22. It will be understood that the motion kinematics can be pivotal, translational, or a combination of both.

Figure 4:
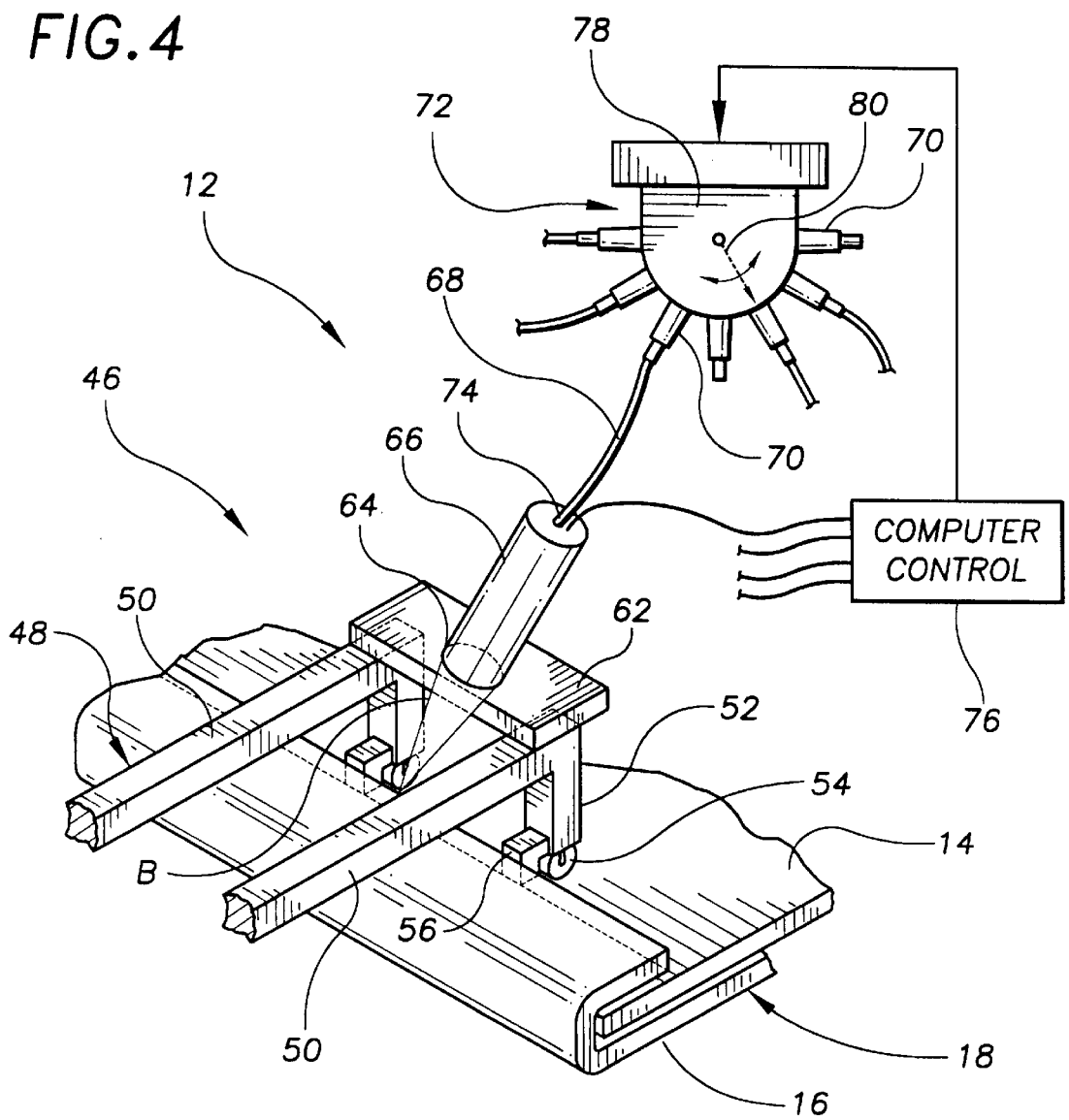
FIG. 4 is an enlarged fragmentary side view of the arrangement of the present invention shown to include a welding unit operatively associated with a hemmed joint and a laser source for delivery of a laser beam to the welding unit under computer control.
Figure 6:
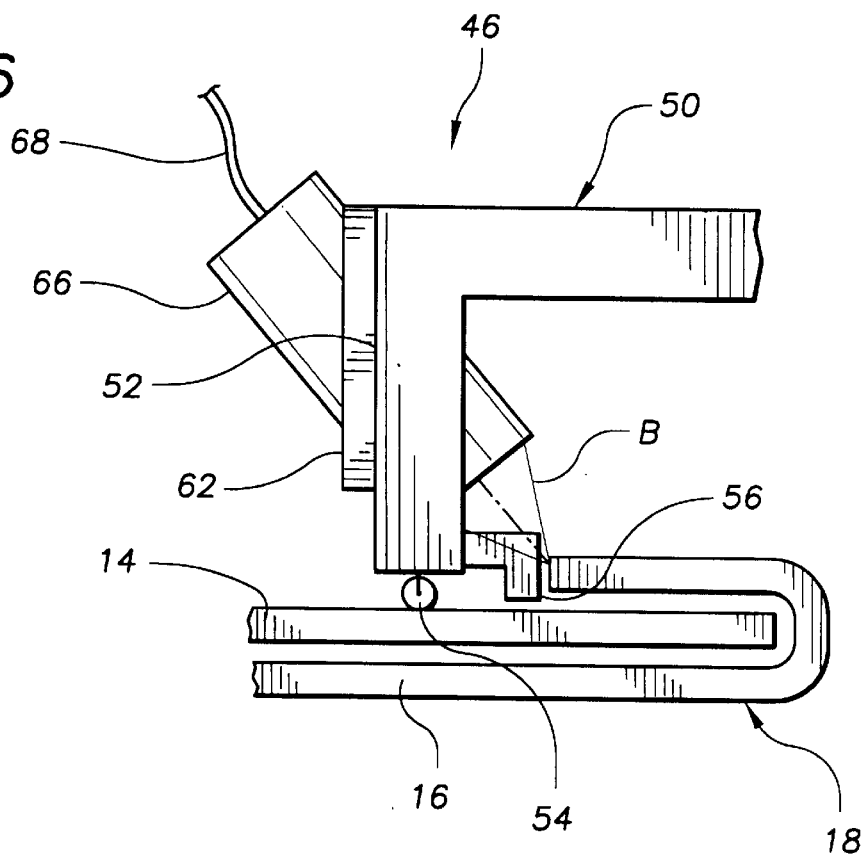
FIG. 6 is a top view of the welding unit of FIG. 4.
Figure 7:
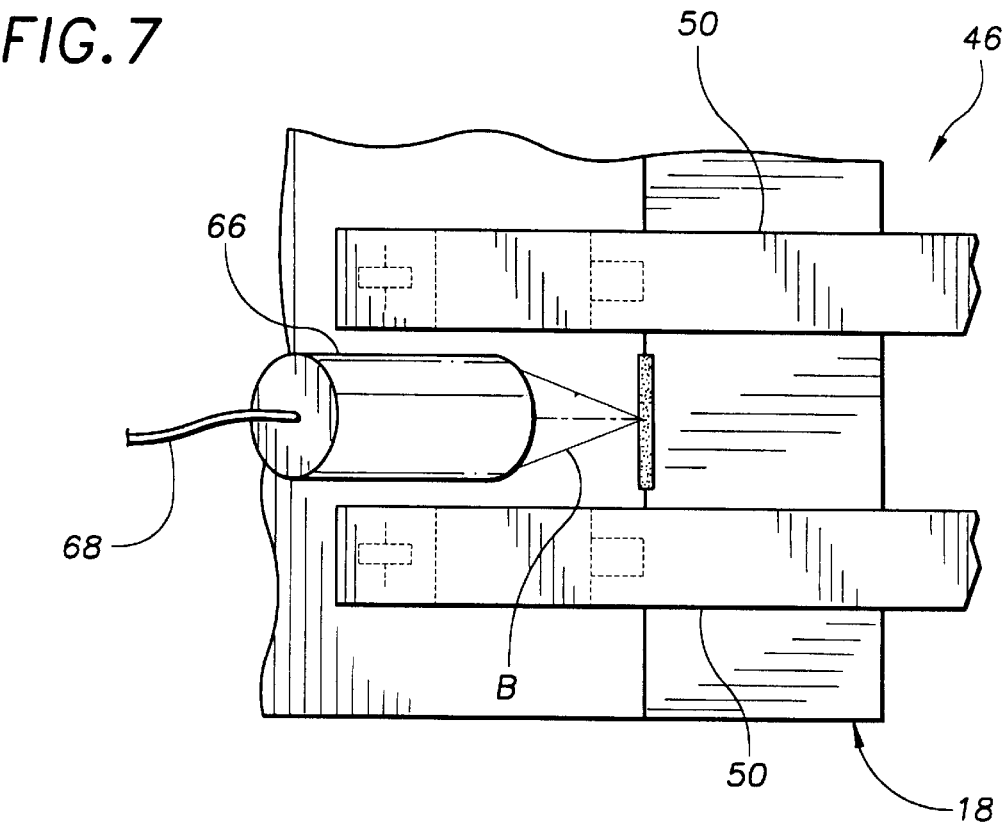
FIG. 7 is a rear perspective view of the welding unit of FIG. 4.

With particular reference to FIGS. 4, 6 and 7, each welding unit 46 is shown to include a driven member (partially shown at 48). In the preferred embodiment, the driven member 48 includes a pair of spaced apart, L-shaped arms 50. The L-shaped arms 50 include a downwardly extending leg 52. At the distal end of each downwardly extending leg 52 is a compliant roller 54 which is intended to engage the inner panel 14 of the door 18 for vertically locating the welding unit 46 relative to the hemmed joint 35. A feeler finger stop 56 laterally extends from the distal end of each downwardly extending leg 52 and is intended to engage the end of the hemmed flange 42 and horizontally locate the welding unit 46 with respect thereto.

Further in the exemplary embodiment illustrated, a mounting flange 62 extends across an upper surface of the pair of L-shaped arms 50 and is formed to include an aperture 64 for receiving a laser beam focusing head 66. An alternate arrangement is shown in FIG. 6 in which the mounting flange 62 is attached to the downwardly extending leg 52 above each of the L-shaped arms 50.

As seen most specifically in FIG. 4, the laser welding arrangement 12 of the present invention further includes a fiber optic cable 68 associated with each welding unit 46. The fiber optic cable 68 includes a first end fitting 70 adapted to be coupled to a laser beam source 72 and a second end 74 coupled to the focusing head 66 for transmitting a laser beam from the laser beam source 72 to the welding unit 46 at the hemming machine 10.

The focusing head 66 includes an outer body, a recollimating lens, a focusing lens and a protective transparent glass cover. The recollimating lens, focusing lens, and glass cover are positioned within the outer body in a spaced apart relation. The focusing lens is movable relative to the outer body to vary the distance between the recollimating lens and the focusing lens, thereby varying the position of the laser beam focal point relative to the glass cover and the distance of the focal point to the edge well. A motor (not shown) may be provided to drive or move the focus lens relative to the recollimating lens.

Again referring to FIG. 4, the laser welding arrangement 12 is shown to further include a computer control 76 for controlling the relative position and operation of the welding units 46. For example, the computer control 76 may remotely operate the drive members 48 to thereby control displacement of the welding units 46. Control of the drive members 48 may be coordinated with control of the hemming cycle. Further, the computer control 76 may control movement of the lens for remotely focusing the laser beam B on the material to be welded.

According to the present invention, the laser beam source 72 may comprise a time-shared distributor 78 of a known design as disclosed in the October, 1989 issue of "Photonics Spectra" magazine in an article entitled "Designer's Handbook—The Modern Industrial YAG Laser". In FIG. 4, the distributor 78 is shown incorporating a multi-positionally switch 80 adapted to route a laser beam B received from a single laser beam generator 72 to any one of a plurality of fiber optic cables 68 in a sequential manner in response to a electrical signal input from the computer control 76. The distributor 78 may also be used to couple a laser beam generator 72 to multiple welding units 46 in a simultaneous fashion, wherein two or more weld joints may be produced at the same time. The preferred laser beam source or generator 72 is a Nd:YAG laser, although other comparable laser generators may be used.

Figure 5A:
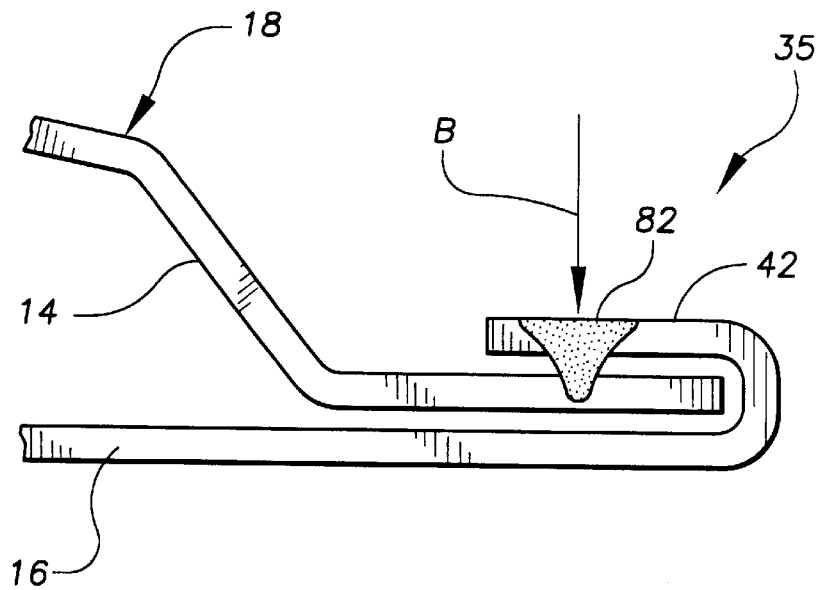
FIG. 5A is a fragmentary view similar to FIG. 3 illustrating a lap weld.
Figure 5B:
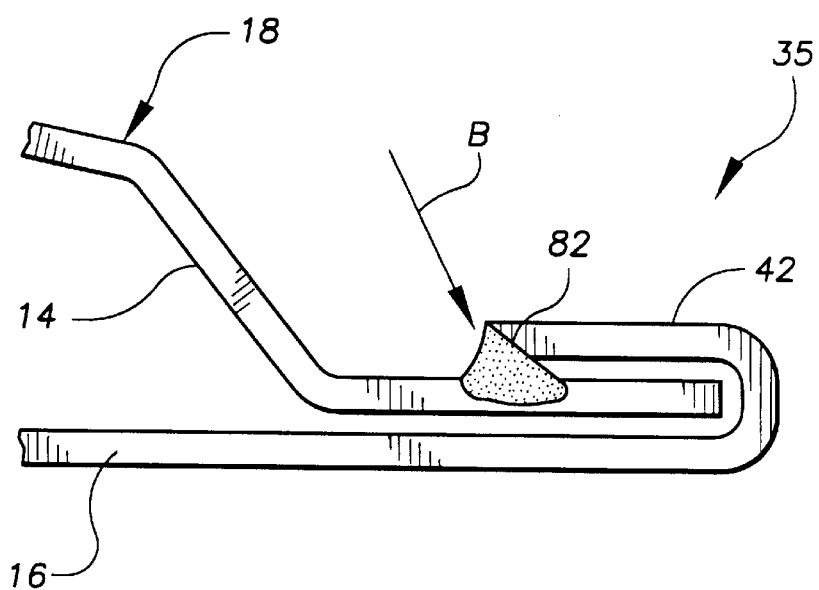
FIG. 5B is a fragmentary view similar to FIG. 3 illustrating a direct fillet.
Figure 5C:
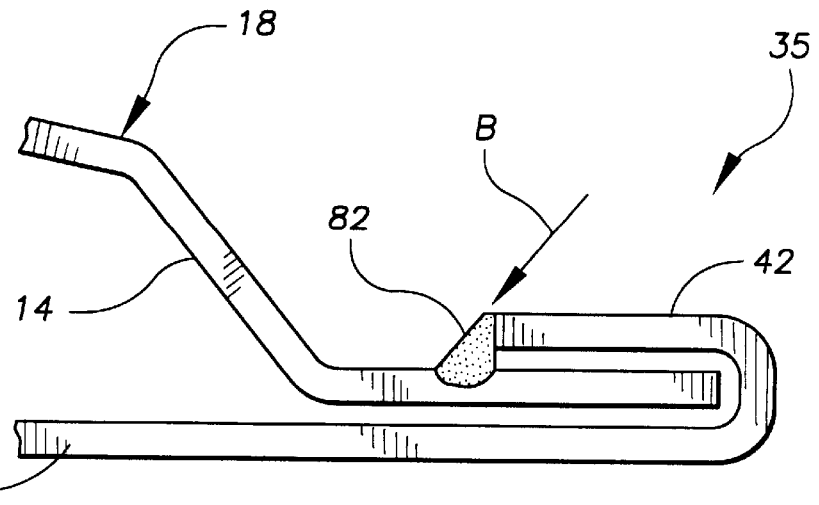
FIG. 5C is a fragmentary view similar to FIG. 3 illustrating a reverse fillet.

With the method and apparatus of the present invention, different types of welds 82 can be produced depending on the orientation of the focusing head 66 with respect to the hemmed joint 35. For example, FIG. 5A illustrates a lap weld 82 formed by orienting the focusing head 66 substantially perpendicular to the hemmed flange 42 such that the beam B is focused at a point inwardly spaced from the distal end of the hemmed flange 42. With reference to FIG. 2, a direct fillet weld 82 is illustrated. The laser beam B is aligned with the distal end of the hem flange 42 with the angle incident to the hemmed sheet thickness. Finally, FIG. 3 illustrates a reverse fillet weld 82 formed with a laser beam B aligned with the edge joint, wherein the angle is reverse-incident to the hemmed sheet thickness. Different sheet material thicknesses can be accommodated through proper selection of welding unit design.

Cover gas can be delivered under computer control to each welding unit 46 after the welding unit 46 engages the hemmed joint 35 and during the welding cycle. In certain applications, forced control and localized cooling of surfaces may be needed to avoid panel distortion and can be realized through integration of sensors (not shown) and cooling circuits (not shown) in the welding units 46, hemming die base 22, or both. Each welding unit 46 can be configured to execute a linear stitch or a two-dimensional pattern by using a single or dual degree of freedom motion system, respectively. The speed of motion can be computer controlled.

With additional reference to the flow diagram of FIG. 8, the general method of utilizing the arrangement heretofore detailed will now be described. In a first general step 100, the inner and outer panels 16 of a vehicle door 18 are placed between the lower and upper dies 20 and 22 of the hemming machine 10. In the next general step 110, a stable condition is established between the inner and outer panels 14 and 16. The locating members 30 are downwardly advanced through movement of the upper shoe 24 and engage the locating holes 34 formed in the vehicle door 18. A clamping force is established by the fingers (not shown) carried by the spider plate 28. In certain application, the stable condition between the inner and outer panels 14 and 16 can be maintain solely by the clamping force (or compressive force) provided by the spider plate 28.

A third general step 120 of the preferred method of the present invention involves forming the hemmed joint 35 between the inner and outer panels 14 and 16 of the vehicle door 18. As the upper shoe 24 continues its downward translation, cam actuators (not shown) carried by the upper shoe 24 cooperate with cam followers (not shown) of the prehemming units 36 to partially form the hemmed joint 35 about the perimeter of the vehicle door 18. Continued downward translation of the upper shoe 24 causes the prehemming units 36 to withdraw from the vehicle door 18 and the upper die 22 to complete the hemmed joint 35.

The final general step 130 of the preferred method of the present invention involves laser welding the hemmed joint 35 while maintaining the stable condition between the inner and outer panels 14 and 16. The locating members 30 remain engaged with the inner and outer panels 14 and 16 of the vehicle door 18 and the fingers of the spider plate 28 remains in contact with the door 18. After the hemmed joint 35 is completely formed, the upper shoe 24 begins to return to its upper position (as shown in FIG. 1). During the initial translation upward, the upper die 22 is retracted but the fingers of the spider plate 28 maintain clamping force on the vehicle door 18 and the locating members 30 remain engaged with the locating holes 34. It is during this stable state that the laser welding is preferably performed. The computer controller 76 controls the delivery of a laser beam source to each of the welding units 46 within the available time of approximately 2–4 seconds.

After the laser welding is complete, the upper shoe 24 fully retracts upwardly. The vehicle door 18 can now be removed from the hemming machine 10. Since the laser welding has occurred in-situ, the potential for the inner and outer panels 14 and 16 moving relative to one another is eliminated.

While the above description constitutes the preferred embodiment of the present invention, it will be appreciated that the invention is susceptible to modification, variation, and change without departing from the proper scope or fair meaning of the accompanying claims.

We claim:

1. A method of producing a laser welded hemmed joint between a pair of metal sheets within a hemming machine having an upper shoe and a lower die, the method comprising the steps of:

placing the pair of metal sheets between the upper die and the lower die of the hemming machine;

providing a welding unit having a horizontally extending finger and a vertically extending compliant roller;

horizontally positioning said welding unit with respect to the pair of metal sheets by engaging one of the metal sheets with said horizontally extending finger;

vertically positioning said welding unit with respect to the pair of metal sheets by engaging said compliant roller with the other of the pair of metal sheets;

forming a hemmed joint between the pair of metal sheets; and laser welding said hemmed joint while maintaining a stable condition between the pair of metal sheets.

2. The method of producing a laser welded hemmed joint of claim 1, further comprising the steps of:

attaching a laser beam focusing head to said welding unit;

interconnecting said laser beam focusing head with a laser beam source; and computer controlling delivery of said laser beam to said laser beam focusing head.

3. The method of producing a laser welded hemmed joint of claim 1 further including the step of applying a compression force to the pair of metal sheets.

4. The method of producing a laser welded hemmed joint of claim 1, wherein the step of horizontally positioning said welding unit includes the step of downwardly displacing said upper die from an upper position to an intermediate position.

5. The method of producing a laser welded hemmed joint of claim 4, wherein the step of forming said hemmed joint between said pair of metal sheets includes the step of downwardly displacing said upper die from said intermediate position to a lower position.

6. The method of producing a laser welded hemmed joint of claim 5, further including the step of upwardly displacing said upper die from said lower position to said intermediate position, said step of upwardly displacing said upper die from said lower position to said intermediate position occurring simultaneously with the step of laser welding said hemmed joint.

7. The method of producing a laser welded hemmed joint of claim 1, wherein the step of laser welding said hemmed joint includes the step of:

providing said welding unit between a first position interbetween said upper and lower dies and a second position retracted therefrom.

8. A method of producing a laser welded hemmed joint between an inner panel and outer panel of a vehicle door, the method comprising the steps of:

providing a welding unit;

placing the inner and outer panels between an upper die and a lower die of a hemming machine;

creating a stable condition between said inner and outer panels by engaging the inner and outer panels with a plurality of locating members;

forming a hemmed joint between said inner and outer panels; and laser welding said hemmed joint while maintaining said stable condition between the inner and outer panels;

wherein said step of creating a stable condition includes the steps of horizontally positioning the welding unit with respect to the inner panel and the outer panel by engaging one of the inner panel and outer panel with a horizontally extending finger and vertically positioning said welding unit with respect to the inner panel and the outer panel by engaging a compliant roller with the other of the inner and outer panels.

9. The method of producing a laser welded hemmed joint between an inner panel and an outer panel of a vehicle door of claim 8, wherein said step of creating a stable condition between the inner and outer panels further includes the step of applying a compressive force to the inner and outer panels.

10. The method of producing a laser welded hemmed joint between an inner panel and an outer panel of a vehicle door of claim 9, wherein the step forming a hemmed joint between said inner and outer panels includes the step of downwardly displacing said upper die from said intermediate position to a lower position.

11. The method of producing a laser welded hemmed joint between an inner panel and an outer panel of a vehicle door of claim 10, further including the step of upwardly displacing said upper die from said lower position to said intermediate position, said step of upwardly displacing said upper die from said lower position to said intermediate position occurring simultaneously with the step of laser welding said hemmed joint.

12. The method of producing a laser welded hemmed joint between an inner panel and an outer panel of a vehicle door of claim 8, wherein the step of engaging the inner and outer panels with a plurality of locating members includes the step of downwardly displacing said upper shoe from an upper position to an intermediate position.

13. The method of producing a laser welded hemmed joint between an inner panel and an outer panel of a vehicle door of claim 8, wherein the step of laser welding said hemmed joint includes the step of:

moving said welding unit between a first position interbetween said upper and lower dies and a second position retracted therefrom.

14. The method of producing a laser welded hemmed joint between an inner panel and an outer panel of a vehicle door of claim 8, wherein the step of laser welding said hemmed joint includes the steps of:

proving a plurality of welding units about the perimeter of the vehicle door, each of said plurality of welding units being movable between a first position interbetween said upper and lower dies and a second position retracted therefrom; and horizontally and vertically locating said welding unit to said second position.

15. The method of producing a laser welded hemmed joint between an inner panel and an outer panel of a vehicle door of claim 14, further including the step of interconnecting each of said plurality of welding units to a laser beam source through a fiber optic cable.

16. The method of producing a laser welded hemmed joint between an inner panel and an outer panel of a vehicle door of claim 15, further comprising the step of computer controlling delivery of a laser beam to each of said plurality of welding units.

17. An arrangement for in-situ laser welding of a hemmed joint within a hemming machine, the hemmed joint formed between a pair of metal panels, the hemming machine having an upper shoe translatable between an upper position, an intermediate position and a lower position, the upper shoe carrying an upper die and at least one locating element, the hemming machine further including a lower die, the arrangement for in-situ laser welding comprising:

at least one welding unit operatively interconnected with the hemming machine for movement between a first position interbetween the upper die and the lower die and a second position displaced therefrom;

a laser beam source;

a focusing head carried by each of said at least one welding unit, said focusing head interconnected to said laser beam source; and a computer controller for controlling delivery of said laser beam source to said focusing head of each of said at least one welding unit such that said laser beam source is delivered to said focusing head when the upper shoe is between the lower position and the intermediate position;

said at least one welding unit including a locating member having a first element for horizontally positioning said welding unit with respect to the hemmed joint and a second element for vertically positioning said welding unit with respect to said hemmed joint, said locating member including a horizontally extending finger for engaging one of the pair of metal panels and a vertically extending compliant roller for engaging the other of the pair of metal panels.

18. A method of producing a laser welded hemmed joint between a pair of metal sheets, the method comprising the steps of:

providing a hemming machine having an upper die and a lower die;

operatively associating a welding unit with said hemming machine;

placing the pair of metal sheets between the upper and lower dies of said hemming machine;

forming a hemmed joint between said pair of metal sheets;

moving said welding unit independently from the upper and lower dies to a first position interbetween the upper and lower dies; and laser welding said hemmed joint with said welding unit in said first position.

19. The method of producing a laser welded hemmed joint between a pair of metal sheets of claim 18, wherein said step of moving said welding unit independently from the upper and lower dies to a first position includes the step of adjusting said welding unit in a horizontal direction.

20. The method of producing a laser welded hemmed joint between a pair of metal sheets of claim 19, wherein said step of moving said welding unit independently from the upper and lower dies to a first position includes the steps of:

horizontally positioning the welding unit with respect to the hemmed joint by engaging one of the pair of metal sheets with a horizontally extending finger and vertically positioning said welding unit with respect to the hemmed joint by engaging a compliant roller with the other of the pair of metal sheets.

21. The method of producing a laser welded hemmed joint between a pair of metal sheets of claim 19, further comprising the step of applying a compression force to the pair of metal sheets.

22. The method of producing a laser welded hemmed joint between a pair of metal sheets of claim 19, wherein the step of forming said hemmed joint between said pair of metal sheets includes the step of downwardly displacing said upper die from said intermediate position to a lower position.

23. The method of producing a laser welded hemmed joint between a pair of metal sheets of claim 22, further including the step of upwardly displacing said upper die from said lower position to said intermediate position, said step of upwardly displacing said upper die from said lower position to said intermediate position occurring simultaneously with the step of laser welding said hemmed joint.

\* \* \* \* \*